(12) United States Patent
Bartosch

(10) Patent No.: US 7,234,369 B2
(45) Date of Patent: Jun. 26, 2007

(54) CONTINUOUSLY ADJUSTABLE SELF-LUBRICATING MILL ROLL DRIVE

(76) Inventor: Georg Bartosch, 84 Alpine Ct., Demarest, NJ (US) 07627

( * ) Notice: Subject to any disclaimer, the term of this patent is extended or adjusted under 35 U.S.C. 154(b) by 124 days.

(21) Appl. No.: 11/003,863

(22) Filed: Dec. 3, 2004

(65) Prior Publication Data
US 2006/0118670 A1 Jun. 8, 2006

(51) Int. Cl.
F16H 35/06 (2006.01)
(52) U.S. Cl. ....................................................... 74/397
(58) Field of Classification Search ................. 74/395, 74/396, 397, 399; 241/30
See application file for complete search history.

(56) References Cited

U.S. PATENT DOCUMENTS

| | | | | |
|---|---|---|---|---|
| 2,693,273 A | * | 11/1954 | Kopplin | 226/177 |
| 2,704,464 A | * | 3/1955 | Lautenbach et al. | 74/325 |
| 3,014,628 A | * | 12/1961 | Littlehale | 226/177 |
| 3,246,822 A | * | 4/1966 | Skeen | 226/155 |
| RE28,107 E | * | 8/1974 | Wilson et al. | 72/235 |
| 4,261,198 A | * | 4/1981 | Moore | 73/162 |
| 4,347,009 A | * | 8/1982 | Brown | 400/611 |
| 4,915,284 A | * | 4/1990 | Goda | 226/177 |
| 4,942,777 A | * | 7/1990 | Fife | 74/397 |
| 5,222,724 A | * | 6/1993 | Hirano et al. | 271/10.11 |
| 5,669,266 A | * | 9/1997 | Kreuter | 74/395 |
| 5,697,603 A | * | 12/1997 | Kato | 271/114 |
| 5,896,771 A | * | 4/1999 | Muller et al. | 72/237 |
| 6,874,776 B2 | * | 4/2005 | Gaarder et al. | 271/10.04 |
| 6,988,722 B2 | * | 1/2006 | Su | 271/117 |

* cited by examiner

Primary Examiner—Vicky A. Johnson
(74) Attorney, Agent, or Firm—Fay Kaplun & Marcin, LLP.

(57) ABSTRACT

Described is an adjustable roll drive including a fixed drive cylinder having a fixed drive gear, a fixed intermediate gear rotated by the fixed drive gear, a movable intermediate gear rotated by the fixed intermediate gear, and a movable driven cylinder having a movable driven gear wherein the movable driven gear is rotated by the movable intermediate gear. A linkage system is employed to maintain a substantially constant distance between axes of successive gears and an adjustment mechanism to vary a distance between the fixed drive cylinder and the movable driven cylinder. The continuously adjustable roll drive may be adapted further for use in grain grinding operations.

10 Claims, 9 Drawing Sheets

View A-A

View B-B

View C-C

# CONTINUOUSLY ADJUSTABLE SELF-LUBRICATING MILL ROLL DRIVE

FIELD OF INVENTION

This invention generally relates to an improved mill roll drive that is capable of adjustment during use and without the necessity for change gears.

BACKGROUND INFORMATION

To produce flour, grain may be fed between two elongated grinding cylinders separated by a specified distance or gap. The milling process may consist of different grinding stages depending on the desired grind of the final product. During the milling process, the grinding cylinders are subject to wear and must be adjusted to maintain the desired gap. A first grinding cylinder axis may be fixed in position while a second grinding cylinder axis is adjustable.

Conventional flour mill roll stands are equipped with oil lubricated gear boxes and utilize change gears to maintain the gap when grinding cylinders wear. A grinding cylinder drive gear may be repeatedly changed for a smaller drive gear to reduce the distance between the grind cylinder axes and thus reduce the gap between the grinding cylinders. In general, millers may change the drive gear up to eight times before replacing a grinding cylinder. Fine adjustments are achieved before replacing a drive gear by moving the adjustable axis of the first grinding cylinder closer to the fixed axis of the second grinding cylinder. The respective drive gears of the first and second grinding cylinders are also moved closer together as a result. Consequently, the drive gears are running outside of the optimal pitch line approximately 90% of the time, thus causing premature gear wear. Regular adjustment to gear position also results in gear box seal leaks.

To overcome the problems associated with gear driven roll drives, belt drives and chain drives have been employed. The use of change gears may be avoided, but belts are subject to high tension and may break without warning requiring emergency repair. Belts must also be tensioned after each adjustment requiring the mill to stand still. Chains experience similar problems as belts and additionally must be lubricated.

SUMMARY OF THE INVENTION

The present invention is directed to a continuously adjustable roll drive. The roll drive according to the present invention may be adjusted without the use of change gears or running the gears outside of the pitch line. The roll drive according to the present invention comprises a fixed drive cylinder having a fixed drive gear, a fixed intermediate gear rotated by the fixed drive gear, a movable intermediate gear rotated by the fixed intermediate gear, and a movable driven cylinder having a movable driven gear, wherein the movable driven gear is rotated by the movable intermediate gear. The roll drive further comprises a linkage system to maintain a substantially constant distance between axes of successive gears, and an adjustment mechanism to vary a distance between the fixed drive cylinder and the movable driven cylinder.

One embodiment of the present invention further comprises grinding cylinders for use in the grain grinding operations of flour mills and/or breweries. In an additional exemplary embodiment, at least one of the gears of the continuously adjustable roll drive is a self-lubricating non-metal gear.

The present invention is also directed to a method of adjusting a distance between two rotating cylinders, comprising the steps of maintaining a substantially fixed pitch line between a fixed drive gear and a fixed intermediate gear, wherein the fixed intermediate gear transfers motion of the drive gear; maintaining a substantially fixed pitch line between the fixed intermediate gear and a movable intermediate gear, wherein the movable intermediate gear transfers motion of the fixed intermediate gear; maintaining a substantially fixed pitch line between the movable intermediate gear and a movable driven gear, wherein the movable driven gear transfers motion of the movable intermediate gear and the movable driven gear is a first distance from the fixed drive gear; and actuating an adjustment mechanism to move the movable driven gear to a second distance from the fixed drive gear, wherein the substantially fixed pitch lines are maintained during the movement.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

The present invention is directed to a continuously adjustable roll drive. The roll drive according to the present invention may be useful as a flour mill roll drive. However, those of skill in the art will understand that there are other applications to which the present invention may be directed. It should be noted that all the gears of the exemplary embodiment described herein may be non-lubricated gears because of the novel arrangement presented herein. Thus, the present invention eliminates the need for any lubrication of the gear mechanism.

Figure 1:
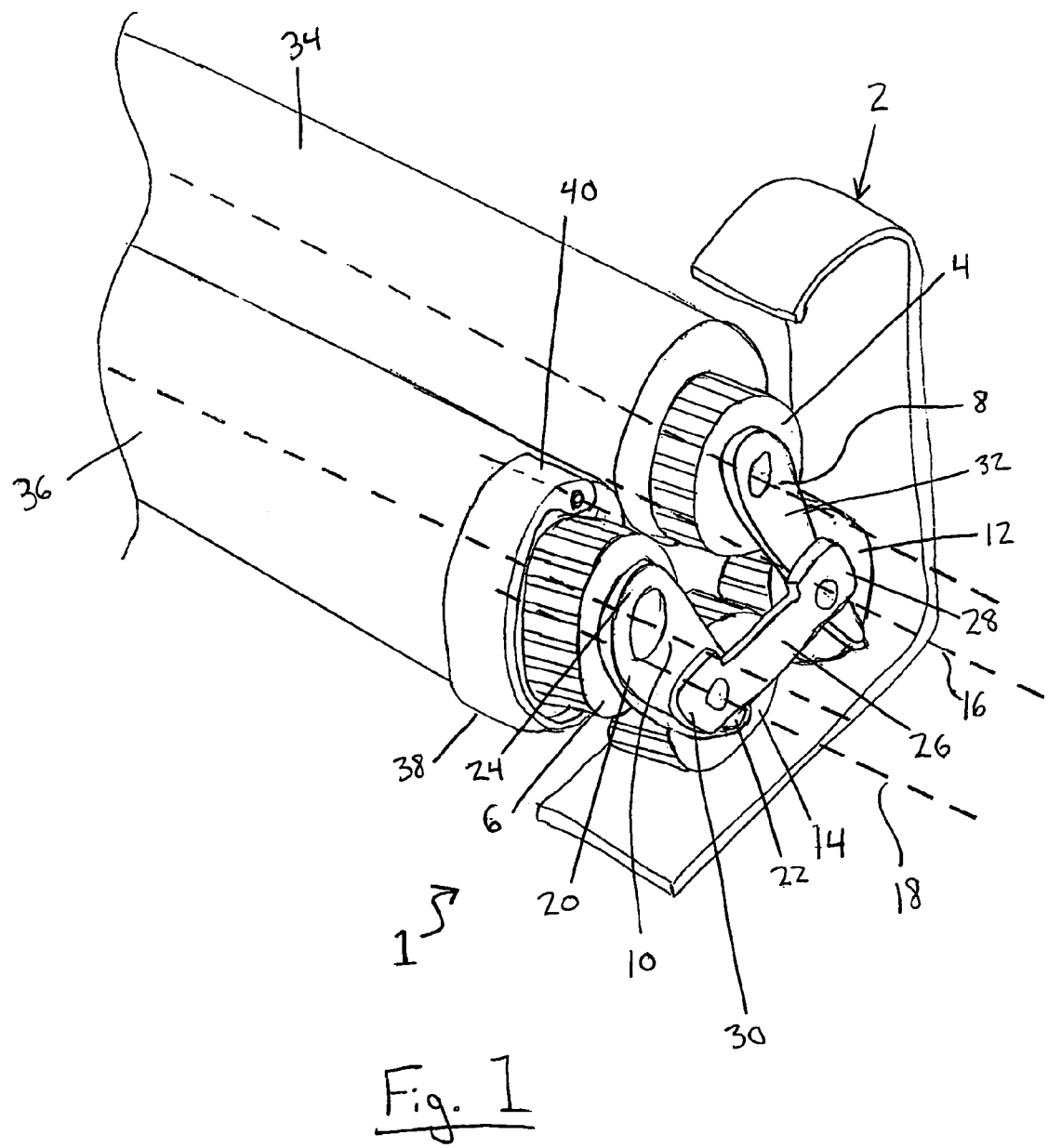
FIG. 1 shows an isometric view of an exemplary embodiment of the roll drive according to the present invention including two grinding cylinders.

FIG. 1 shows an exemplary embodiment of the roll drive 1. The roll drive 1 may be supported by a roll drive stand 2 or other support means known to those of ordinary skill in the art. The roll drive 1 comprises a drive gear 4 and a driven gear 6. The drive gear 4 and the driven gear 6 are free to rotate about separate and substantially parallel longitudinal axes 8 and 10, respectively. The longitudinal axis 8 of the drive gear 4 is in a fixed position with reference to the roll drive 1. In an exemplary embodiment of the present invention shown in FIGS. 5–8, the distance between the fixed longitudinal axis 8 of the drive gear 4 and a movable longitudinal axis 10 of the driven gear 6 is approximately 0.26 m (10.06 in). Those skilled in the art will understand that the dimensions provided throughout this description are only exemplary dimensions for the described exemplary embodiment. Other embodiments may include dimensions different from those described herein.

As shown in FIG. 1, the roll drive 1 includes at least two intermediate gears comprising a first intermediate gear 12 and a second intermediate gear 14. The first intermediate gear 12 and the second intermediate gear 14 are free to rotate about separate and substantially parallel axes, a fixed axis 16 of the first intermediate gear 14 and a movable axis 18 of the second intermediate gear 14. The fixed axis 16 of the first intermediate gear 12 is fixed in position with reference to the roll drive 1, either by connection to the roll drive stand 2 or other means known to those of ordinary skill in the art. The first intermediate gear 12 is in communication with the drive gear 4 and the second intermediate gear 14.

In an exemplary embodiment shown in FIGS. 5–8, the relative distance between the fixed longitudinal axis 8 of the drive gear 4 and the fixed axis 16 of the first intermediate gear 6 is approximately 0.21 m (8.21 in.). The second intermediate gear 14 is in communication with the driven gear 6 thereby allowing the drive gear 4 to indirectly rotate the driven gear 6 via the first intermediate gear 12 and the second intermediate gear 14. A means of supplying continuous torque may be included in communication with the drive gear 4.

Shown in FIG. 1, the roll drive 1 may comprise a linkage system to fix and maintain the relative distances between the axes of any or all of the gears and desired pitches between the respective gears. Such linkage system may comprise a first linkage 20 with a first end 22 and a second end 24, and a second linkage 26 with a first end 28 and a second end 30. The first end 22 of the first linkage 20 is connected to the second intermediate gear 14 and the second end 24 is connected to the driven gear 6. The first end 28 of the second linkage 26 is connected to the first intermediate gear 12 and the second end 30 is connected to the second intermediate gear 14. The drive gear 4 and the first intermediate gear 12 may optionally be connected via a third linkage 32. However, since drive gear 4 and intermediate gear 12 may be fixed to a frame (not shown) of the roll drive 1, the third linkage may not be required. In an exemplary embodiment of the present invention shown in FIGS. 5–8, the distance between the fixed axis 16 of the fist intermediate gear 12 and the movable axis 18 of the second intermediate gear 14 is approximately 0.22 m (8.69 in), and the distance between the movable axis 18 of the second intermediate gear 14 and the movable longitudinal axis 10 of the driven gear 6 is approximately 0.23 m (9.18 in).

The roll drive 1 may also comprise a first grinding cylinder 34 and a second grinding cylinder 36. The first grinding cylinder 34 and the second grinding cylinder 36 are preferably of an elongated cylinder shape. The first grinding cylinder 34 and the second grinding cylinder 36 are attached to the drive gear 4 and the driven gear 6, respectively, and are free to rotate about longitudinal axes 8 and 10 respectively. In an exemplary embodiment of the present invention shown in FIGS. 5–8, the first grinding cylinder 34 and the second grinding 36 cylinder are approximately 0.25 m (10 in) in diameter and 1.02 m (40 in) in length.

Figure 2:
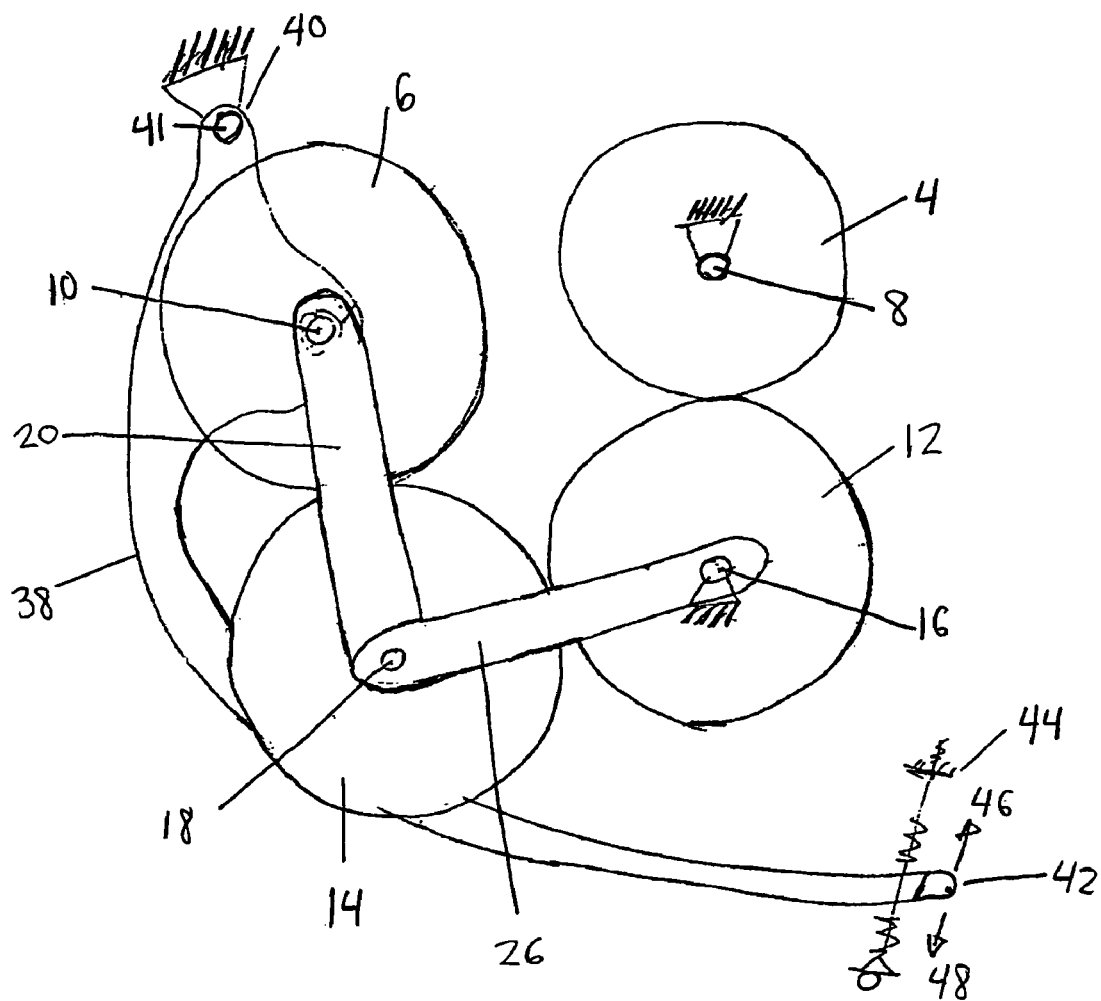
FIG. 2 shows a first side view of an exemplary embodiment of the present invention.

The roll drive 1 also includes an adjustment means for varying the relative distance between the driven gear 6 and the drive gear 4, and consequently varying the relative distance between the second grinding cylinder 36 and the first grinding cylinder 34 if employed. FIG. 2 shows a first side view of the gearing mechanism for the roll drive 1. As shown in FIG. 2, the adjustment means may comprise an adjustment lever 38. The adjustment lever 38 may include a first end 40 and a second end 42. The first end 40 may be coupled at location 41 to a frame (not shown) of the roll drive 1 and free to rotate about an axis fixed in relation to the roll drive 1. As would be understood by one skilled in the art, the cylinder 36 includes a shaft (not shown) which is coupled to the drive gear 6 to cause the cylinder to rotate. The adjustment lever 38 may be rotationally coupled to the driven gear 6 and cylinder 36 combination by the shaft (not shown) being inserted through a via in the adjustment lever 38. The adjustment lever 38 may be mounted in this manner on either side of the driven gear 6, i.e. the side closest to the cylinder 36 or the side away from the cylinder 36. In addition, those skilled in the art will understand that other manners of coupling the adjustment lever 38 to the driven gear 6 may be used as long as the driven gear 6 is free to rotate about the longitudinal axis 10.

In the exemplary embodiment, the adjustment lever 38 includes a curved shape allowing the adjustment lever 38 to curve around the circumference of the driven gear 6 and/or the cylinder 36 and extend to the front of the mill stand where it is accessible. The adjustment lever 38 may take on other shapes as long as it does not interfere with the rotation of any of the gears 4, 6, 12, or 14 or the cylinders 34 and 36. The second end 42 may further be connected to an adjustment control 44 comprising, for example, a screw and spring loaded mechanism for mechanical adjustment. In other embodiments, the adjustment control 44 includes an automated adjustment device.

As shown in FIG. 2, the adjustment lever 38 may be coupled to the driven gear 6 as described above. The adjustment lever 38 may be capable of movement in a direction 46 and a direction 48 via the adjustment control 44. In an exemplary embodiment according to the present invention, displacement of the second end 42 of the adjustment lever 38 may result in a change in the position of the driven gear 6.

Figure 3:
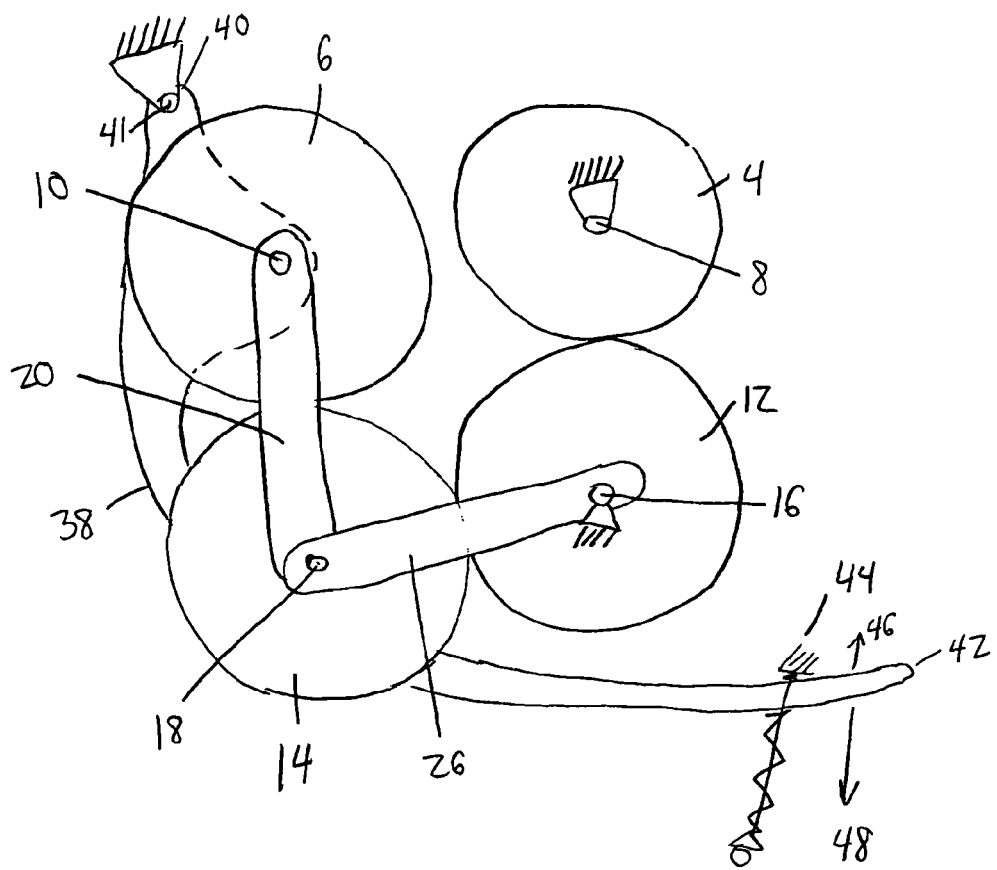
FIG. 3 shows a second side view of an exemplary embodiment of the present invention.

FIG. 3 shows a second side view of an exemplary embodiment of the gearing mechanism for the roll drive 1. The second end 42 of the adjustment lever 38 may be displaced in the direction 46. As a result, the driven gear 6 may move closer to the drive gear 4 and the distance between the longitudinal axes 8 and 10 may decrease. The driven gear 14 may also be displaced to remain in contact with the driven gear 6.

Figure 4:
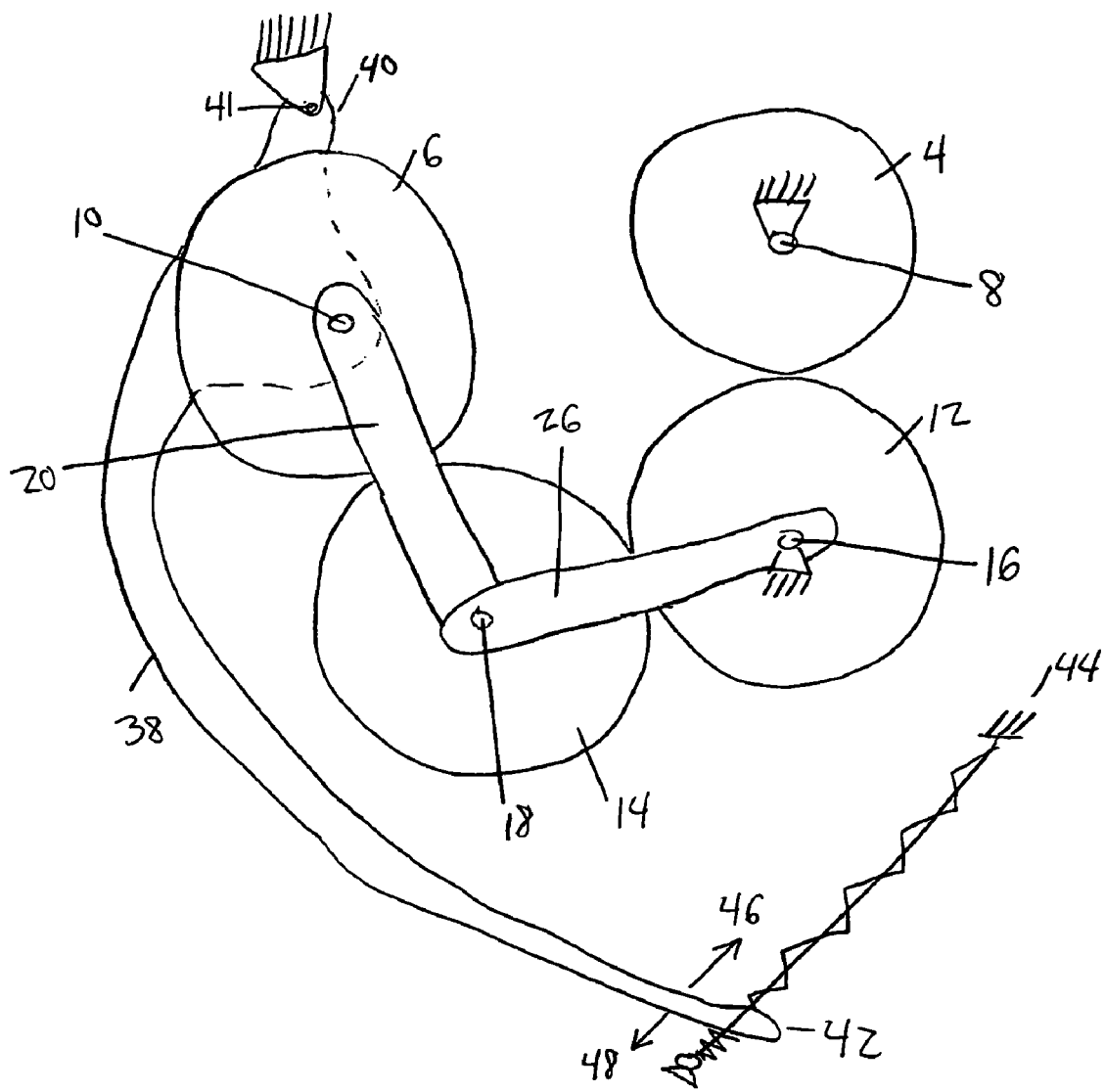
FIG. 4 shows a third side view of an exemplary embodiment of the present invention.

FIG. 4 shows a third side view of an exemplary embodiment of the gearing mechanism for the roll drive 1. The second end 42 of the adjustment lever 38 may be displaced in the direction 48. As a result, the driven gear 6 may move in a direction away from the drive gear 4. The distance between the longitudinal axes 8 and 10 may increase and the driven gear 14 may also be displaced.

As FIGS. 3 and 4 show, the position of the driven gear 6 relative to the drive gear 4 may be adjusted using the adjustment lever 38 while maintaining uninterrupted communication between the drive gear 4 and the first intermediate gear 12, the first intermediate gear 12 and the second intermediate gear 14, and the second intermediate gear 14 and the driven gear 6. Therefore, the distance between the driven gear 6 and the drive gear 4, or a gap between the first grinding cylinder 34 and the second grinding cylinder 36, may be adjusted while supplying a continuous torque to the gearing mechanism.

In an exemplary embodiment according to the present invention, the adjustment lever 38 may be used for coarse adjustment of the position of the driven gear 6. Fine adjustment of the position of the driven gear 6 may be accomplished with a handwheel (not shown) on the adjustment control 44. As one of ordinary skill in the art will understand, the handwheel may rotate a screw (e.g., fixed to the second end 42 of the adjustment lever 38) to allow for fine adjustment in the directions 46 and 48 via, for example, counterclockwise and clockwise rotation of the handwheel, respectively. In other embodiments, the adjustment control 44 includes an automated device. For example, an automated adjustment control 44 may be configured to continuously maintain a specified distance between the driven gear 6 and drive gear 8.

As one of ordinary skill in the art will understand, movement of the adjustment lever 38 during continuous milling operations will result in the movement of driven gear 6, second intermediate gear 14 and linkages 20 and 26. For example, the mill may be operating at full capacity meaning that each of the drive gear 4, the first intermediate gear 12, the second intermediate gear 14 and the driven gear 6 may be rotating at a high speed about their respective axes. An adjustment made to move the driven gear 6 closer to the drive gear 4 will cause the longitudinal axis 10 of driven gear 6 to be moved relative to each of the other gears 4, 12 and 14. However, this adjustment will also result in movement of the second intermediate gear 14 relative to the driven gear 6 and the first intermediate gear 12, i.e., the longitudinal axis 18 is moved relative to longitudinal axes 10 and 16. This relative movement of the gears 6 and 14 is accomplished by a rotation of the first linkage 20 about the axis 18 (second intermediate gear 14) and the axis 10 (driven gear 6) and/or a rotation of the second linkage 26 about the axis 18 (second intermediate gear 14) and the axis 16 (first intermediate gear 12) The rotation of the linkages 20/26 about the respective axes may be considerably slower (and possibly opposite in direction) than the rotation of the gears about their respective axes. Therefore, a rotation mechanism may be used for each of the gears (e.g., the first intermediate gear 12, the second intermediate gear 14 and the driven gear 6) which have multiple rotations about their axes (e.g., mill rotation and linkage rotation).

Figure 5:
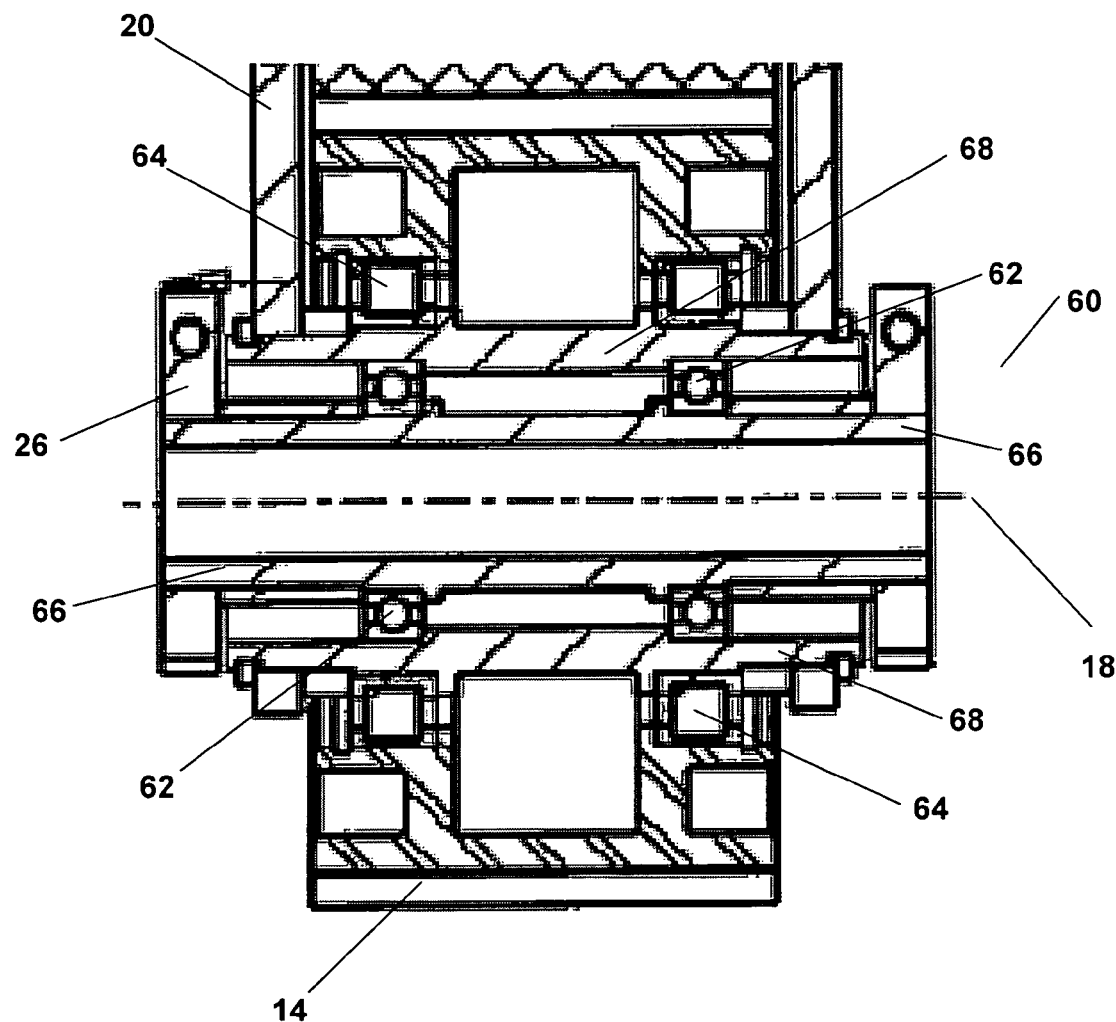
FIG. 5 shows a cross-sectional view of a rotation mechanism according to the present invention.

FIG. 5 shows a cross-sectional view of an exemplary embodiment of a rotation mechanism 60 that is described with reference to the second intermediate gear 14. However, the rotation mechanism may be included with any of the gears. The rotation mechanism 60 may include an inner bearing system 62 and an outer bearing system 64. Each bearing system 62/64 may include at least one cylindrical bearing (e.g., ball bearings, roller bearings, etc.). The rotation mechanism 60 may also include an inner shaft 66 and an outer shaft 68, each rotatable about the axis 18. In the exemplary embodiment, the second linkage 26 is attached about the inner shaft 66. The first linkage 20 is attached about the outer shaft 68. The outer shaft 68 is rotatable about the inner shaft 66 via the inner bearing 62. The second intermediate gear 14 is rotatable about the outer shaft 68 via the outer bearing system 64. Thus, during the adjustment that was described above, the gear 14 may be rotating about axis 18 at the high rate of speed. However, the outer shaft 68 (and consequently the second linkage 26) and the inner shaft 66 (and consequently the first linkage 20) may be rotated at a much slower speed (or in an opposite direction) about axis 18 to compensate for the adjustment of moving the driven gear 6 closer to the driver gear 4. In other embodiments (e.g., for first intermediate gear 12 and driven gear 6), the rotation mechanism may include only a single complex bearing facilitating the rotation of the gear and a single one of the linkages about the respective axis.

Figure 6:
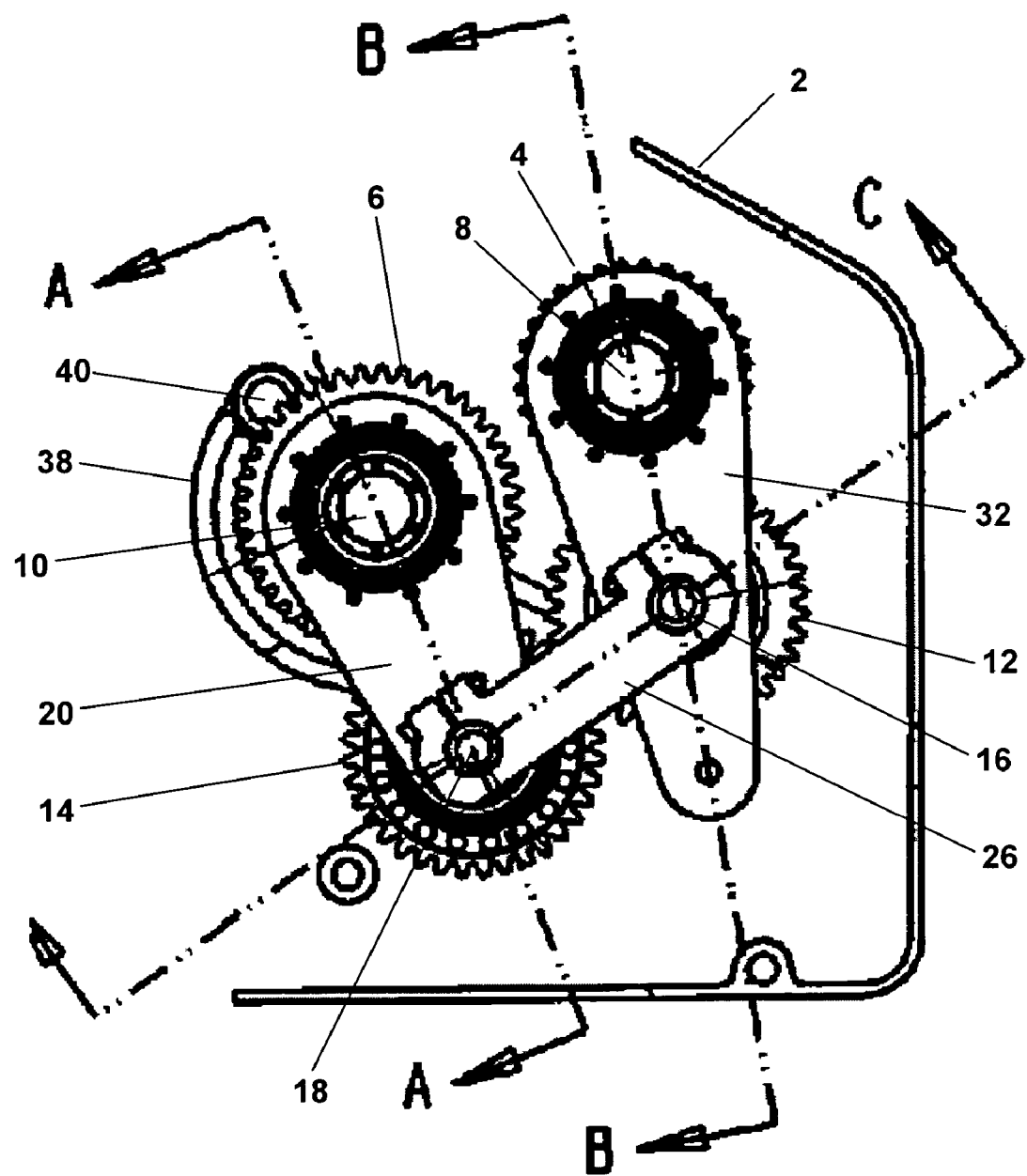
FIG. 6 shows a fourth side view of an exemplary embodiment of the present invention.
Figure 7:
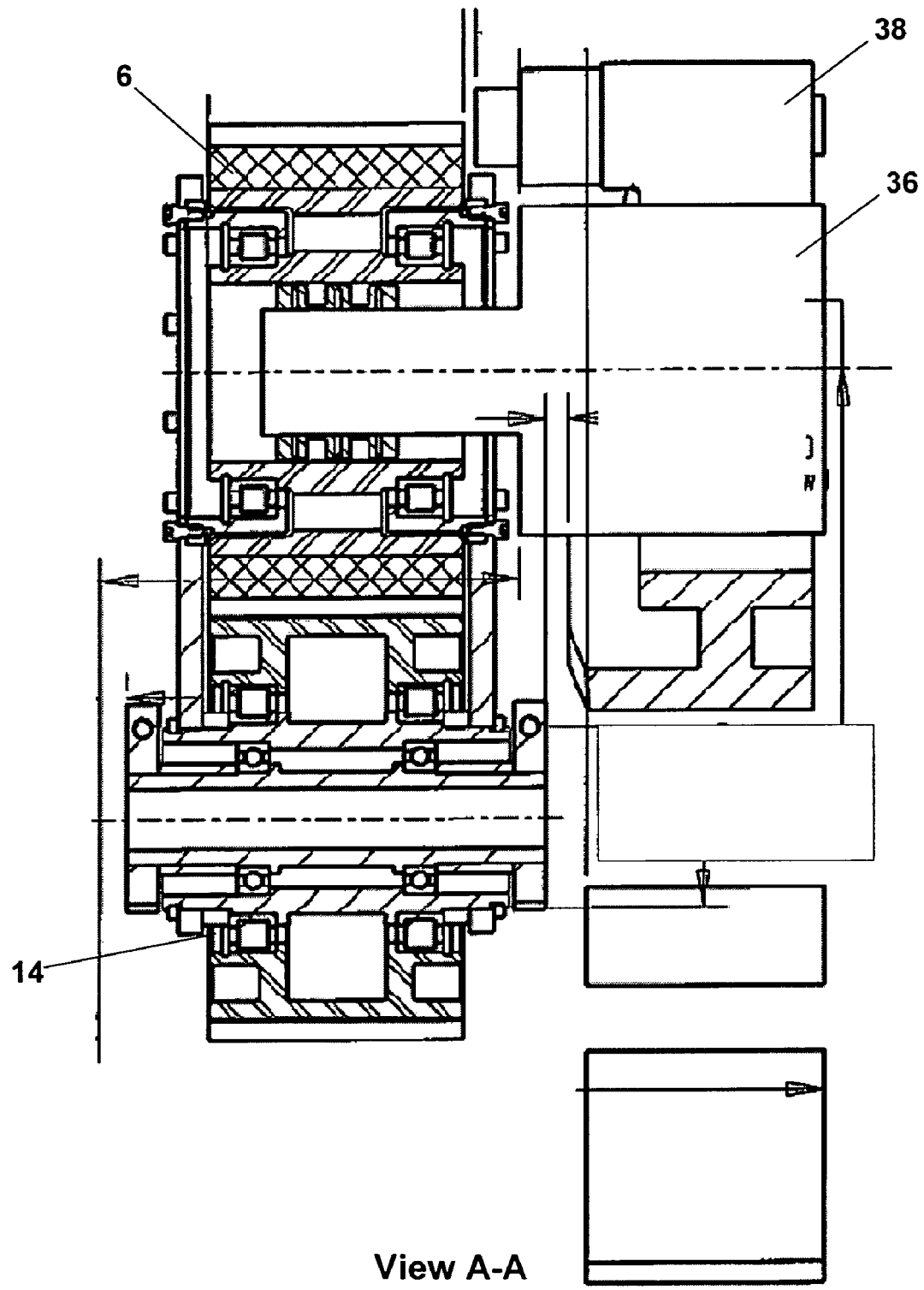
FIG. 7 shows a cross-sectional view of plane A—A as represented on FIG. 6.
Figure 8:
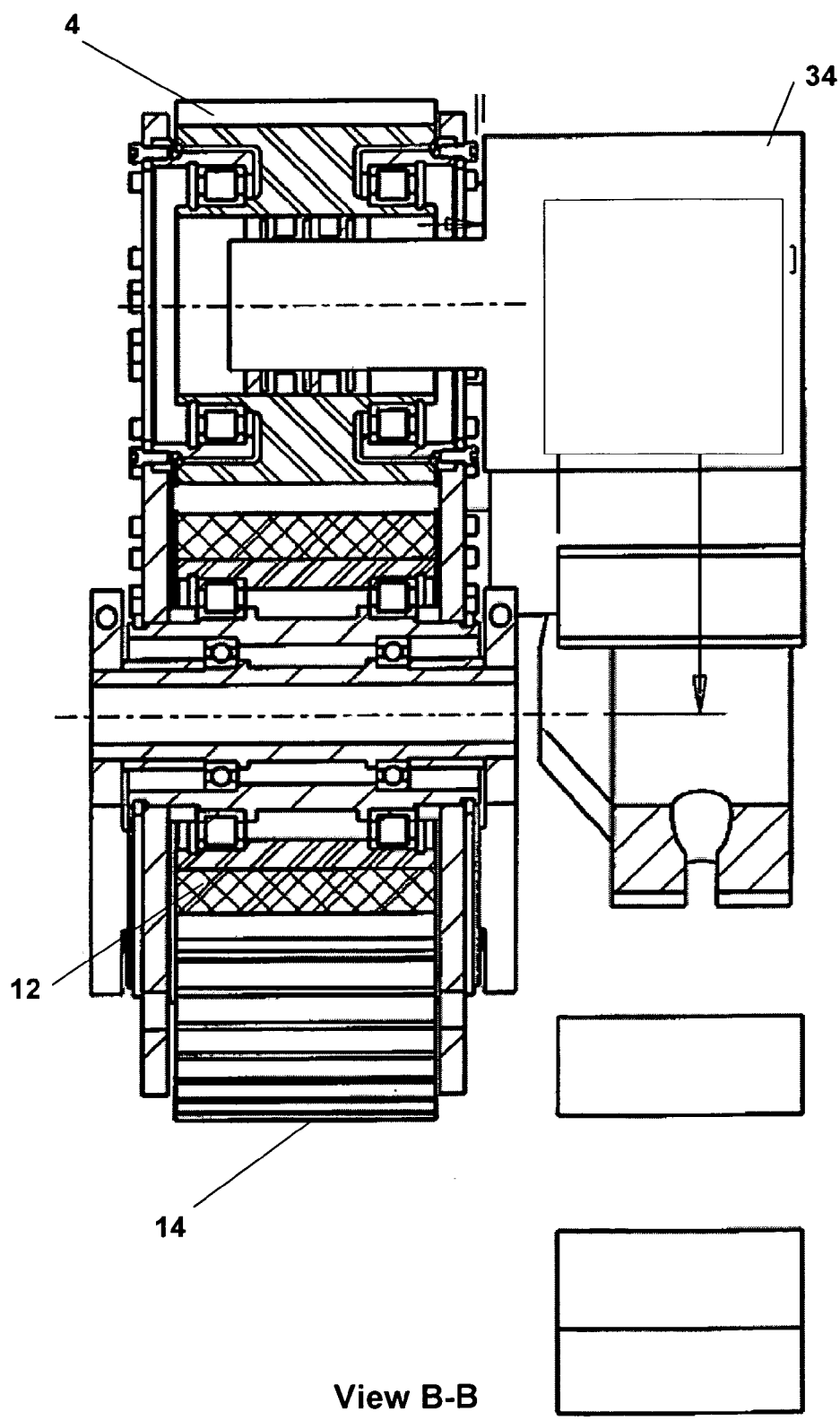
FIG. 8 shows a cross-sectional view of plane B—B as represented on FIG. 6.
Figure 9:
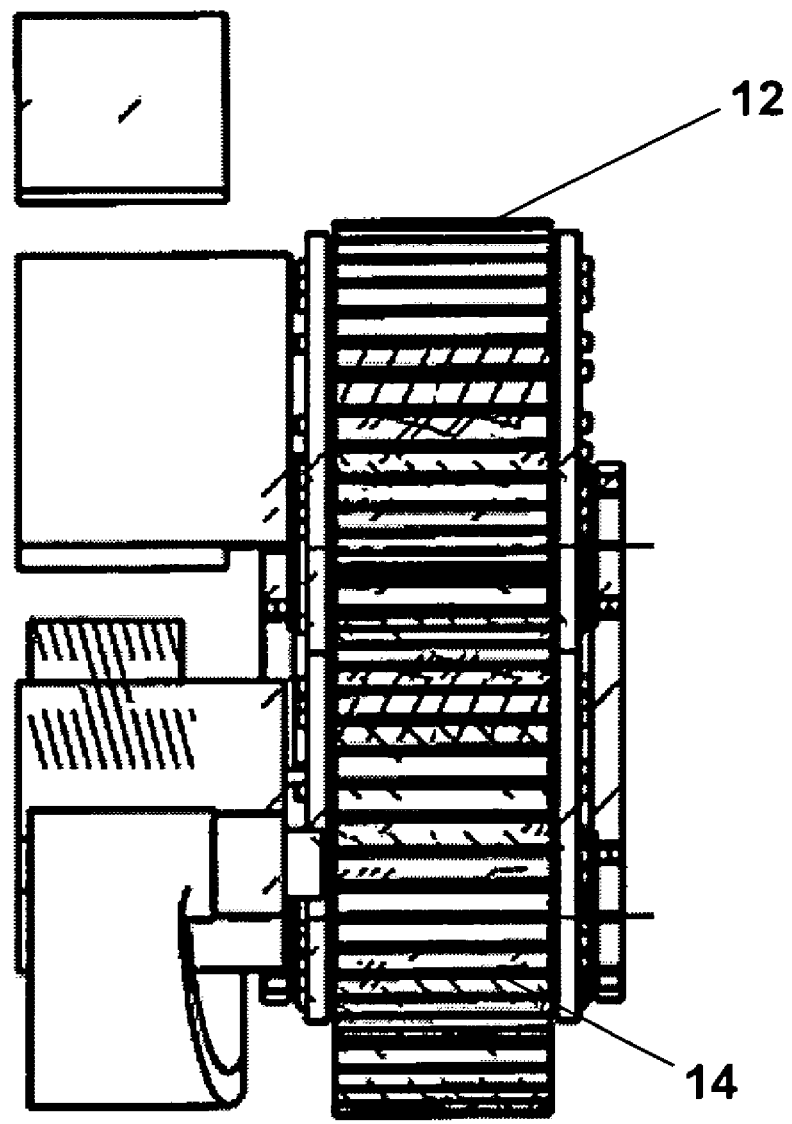
FIG. 9 shows a cross-sectional view of plane C—C as represented on FIG. 6.

FIG. 6 shows a fourth side view of an additional exemplary embodiment of the roll drive 1. A plane A—A, a plane B—B, and a plane C—C are shown. FIGS. 7, 8, and 9 show cross-sectional views of such exemplary embodiment corresponding to the plane A—A, the plane B—B, and the plane C—C respectively. Approximate dimensions of this exemplary embodiment are provided in inches.

In an exemplary embodiment of the present invention, any or all of the gears employed are of a self lubricating non-metal type. Examples of such a self-lubricating gear system include those disclosed in U.S. Pat. No. 5,423,232, herein incorporated by reference. The term self-lubricating is used here to mean that no lubrication is necessary. This may be achieved, for example, but minimizing metal-to-metal contact in a gear system. For example, the drive gear 4 may be a self-lubricating non-metal gear and the first intermediate gear 12 may be a metal gear. Additionally, the second intermediate gear 14 may be a self-lubricating non-metal gear, and the driven gear 6 may be a self-lubricating non-metal gear or a metal gear. A non-metal material may comprise, but is not limited to, nylon 12, lauramid, nyaltron, delrin, phenolic composites or combinations thereof. As would be understood by one of ordinary skill in the art, any or all of the gears may be secured to their respective axes using keyless locking devices.

The roll drive 1 according to the present invention may be employed in milling operations to allow for the maintenance of a specified gap between the first grinding cylinder 34 and the second grinding cylinder 36. The present invention allows for adjustments to be made at any time, even during milling operations, without replacing drive gears. Upon wear of either grinding cylinder, the adjustment lever 38 or other similar means may be manipulated to decrease the relative distance between the driven gear 6 and the drive gear 4, thus reducing the gap between the grinding cylinders. Therefore, the present invention eliminates the need for change gears.

The roll drive 1 according to the present invention allows for the gear mechanism to rotate freely without tension between gears. Coarse or fine adjustments may be made using the exemplary embodiments of the present invention and these adjustments will have no affect on the pitch line of the gears, i.e., the gears remain in pitch line mesh through the entire adjustment range. Therefore, the present invention allows for a desired tooth mesh to be maintained at all times facilitating optimal gear life.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A gearing mechanism, comprising:
a drive gear rotating about a drive gear longitudinal axis;
a first intermediate gear rotating about a first intermediate gear longitudinal axis and transferring motion of the drive gear;
a second intermediate gear rotating about a second intermediate gear longitudinal axis and transferring motion of the first intermediate gear;
a driven gear rotating about a driven gear longitudinal axis which is a first distance from the drive gear longitudinal axis, the intermediate gears transferring motion of the drive gear to the driven gear; and an adjustment mechanism which moves the driven gear longitudinal axis from the first distance to a second distance from the drive gear longitudinal axis, wherein the longitudinal axes of each of the first intermediate gear, the second intermediate gear and the driven gear are movable with respect to the longitudinal axes of each of the other gears.

2. The gearing mechanism of claim 1, further comprising:
a first linkage coupling the driven gear to the second intermediate gear.

3. The gearing mechanism of claim 2, further comprising:
a second linkage, coupling the second intermediate gear to the first intermediate gear.

4. The gearing mechanism of claim 1, wherein one of the driven gear, the drive gear, the first intermediate gear, and the second intermediate gear is non-lubricated.

5. The gearing mechanism of claim 1, wherein the adjustment mechanism moves the driven gear from the first distance to the second distance while the gearing mechanism is in operation.

6. The gearing mechanism of claim 5, further comprising:
a drive cylinder coupled to the drive gear and rotating about the drive gear longitudinal axis; and
a driven cylinder coupled to the driven gear and rotating about the driven gear longitudinal axis.

7. The gearing mechanism of claim 6, wherein, when the adjustment mechanism moves the driven gear from the first distance to the second distance while the gearing mechanism is in operation, a speed of rotation for each of the drive cylinder and the driven cylinder remain substantially unchanged.

8. The gearing mechanism of claim 1, wherein, when the adjustment mechanism moves the driven gear from the first distance to the second distance, a pitch line of each of the driven gear, drive gear, first intermediate gear, and second intermediate gear remains substantially unchanged.

9. A method of adjusting a distance between two rotating cylinders, comprising the steps of:
maintaining a substantially fixed pitch line between a fixed drive gear and a fixed intermediate gear, wherein the fixed intermediate gear transfers motion of the drive gear;
maintaining a substantially fixed pitch line between the fixed intermediate gear and a movable intermediate gear, wherein the movable intermediate gear transfers motion of the fixed intermediate gear;
maintaining a substantially fixed pitch line between the movable intermediate gear and a movable driven gear, wherein the movable driven gear transfers motion of the movable intermediate gear and the movable driven gear is a first distance from the fixed drive gear; and
actuating an adjustment mechanism to move the movable driven gear to a second distance from the fixed drive gear, wherein the substantially fixed pitch lines are maintained during the movement.

10. A system, comprising:
a drive gear rotating about a drive gear longitudinal axis;
a first intermediate gear rotating about a first intermediate gear longitudinal axis and transferring motion of the drive gear;
a second intermediate gear rotating about a second intermediate gear longitudinal axis and transferring motion of the first intermediate gear;
a driven gear rotating about a driven gear longitudinal axis which is a first distance from the drive gear longitudinal axis, the intermediate gears transferring motion of the drive gear to the driven gear;
an adjustment mechanism which moves the driven gear longitudinal axis from the first distance to a second distance from the drive gear longitudinal axis;
a drive cylinder coupled to the drive gear and rotating about the drive gear longitudinal axis; and
a driven cylinder coupled to the driven gear and rotating about the driven gear longitudinal axis,
wherein, when the adjustment mechanism moves the driven gear from the first distance to the second distance while the system is in operation, a speed of rotation for each of the drive cylinder and the driven cylinder remain substantially unchanged.

* * * * *